United States Patent [19]

Allcock et al.

[11] B 3,917,802

[45] Nov. 4, 1975

[54] MOLECULAR WEIGHT CONTROL IN $(NPCl_2)_n$ POLYMERIZATION

[75] Inventors: Harry Rex Allcock; James Earl Gardner, both of State College, Pa.

[73] Assignee: The Firestone Tire & Rubber Company, Akron, Ohio

[22] Filed: Apr. 11, 1973

[21] Appl. No.: 350,219

[44] Published under the Trial Voluntary Protest Program on January 28, 1975 as document no. B 350,219.

[52] U.S. Cl. .................................. 423/300; 260/2 P
[51] Int. Cl.² .................. C01B 25/10; C01B 21/52
[58] Field of Search ...................... 260/2 P; 423/300

[56] References Cited
UNITED STATES PATENTS 3,370,020  2/1968  Allcock et al. ...................... 260/2 P
3,443,913  5/1969  Bienick et al. ...................... 260/2 P

*Primary Examiner*—Wilbert J. Briggs, Sr.

[57] ABSTRACT

The molecular weight of the $(NPCl_2)$ polymer produced from the thermal polymerization of chlorocyclophosphazene trimer and/or tetramer or mixtures of trimer and tetramer is controlled by conducting the polymerization in the presence of controlled amounts of $PCl_5$.

3 Claims, No Drawings

MOLECULAR WEIGHT CONTROL IN $(NPCl_2)_n$ POLYMERIZATION

The thermal polymerization of $(NPCl_2)$ is known and is described, for example in U.S. Pat. No. 3,370,020 issued Feb. 20, 1968 to Allcock and Kugel and elsewhere in the technical literature.

As described in the patent, the charge materials may be trimer or tetramer or mixtures of trimer and tetramer and it is necessary that the starting materials be substantially pure.

In the absence of $PCl_5$, chlorocyclophosphazene trimer is believed to polymerize according to the scheme:

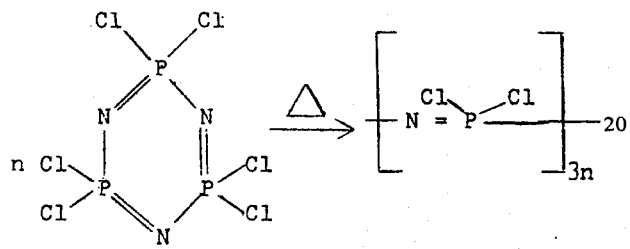

where $n$ may be as high or higher than 5,000. A similar reaction occurs with the tetramer. No method is presently known by which the molecular weight of the polymer can be controlled by simple variation in the temperature, polymerization time, or pressure in the polymerization vessel.

In the presence of $PCl_5$ the nature of the resulting product can be varied according to the amount of $PCl_5$ present in the polymerization mixture. This is illustrated by the results set forth in the table below, the data having been obtained by the following experimental procedure.

Hexachlorocyclotriphosphazene was purified by sulfuric acid extraction from heptane solution, followed by precipitation onto ice, three recrystallizations from heptane, and two vacuum sublimations. A cooled sample of this material (20 g) was degassed in a constricted thick walled glass tube after addition of a weighed amount of phosphorus pentachloride. The evacuated tube was sealed, the contents were melted and mixed, and the tube was placed in a thermo-regulated oven at 250°C for 24 hours. After completion of the reaction, the product in each tube was analyzed by $31_P$ NMR spectroscopy, by solution viscosity techniques, and by gel permeation chromotography.

TABLE

Effect of $PCl_5$ on the Polymerization of $(NPCl_2)_3$ after 24 Hours at 250°C

| Moles $PCl_5 \times 100$ / Moles $(NPCl_2)_3$ | Appearance of Product | Products | Relative Solution Viscosity* |
|---|---|---|---|
| 26.8 | Heterogeneous fluid | Cyclics and linear oligomers | 1 |
| 5.5 | Heterogeneous fluid | Cyclics and linear oligomers | 1.03 |
| 1.4 | Heterogeneous fluid | Cyclics and linear oligomers | 1.03 |
| 0.09 | Homogeneous fluid | Polymer + $(NPCl_2)_3$ | 1.3 |
| 0.006 | Viscous fluid | Polymer + $(NPCl_2)_3$ | 1.6 |
| 0 | Very viscous fluid or elastomer | Polymer | 1.8 |

*Relative solution viscosity is indicative of the degree of polymerization.

While not wishing to be bound by any specific theory as to how the $PCl_5$ functions in the polymerization mixture, it appears that phosphorus pentachloride can function both as a chain termination agent and as a ring or chain cleavage agent. For example, the reaction of $PCl_5$ with a cyclic phosphazene may proceed as follows:

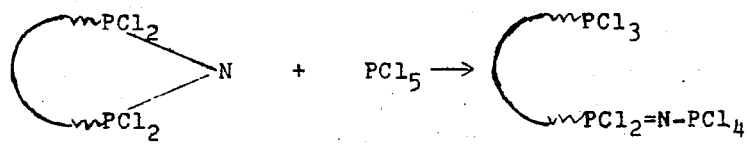

Reaction of $PCl_5$ with a chain apparently leads to a similar type of cleavage.

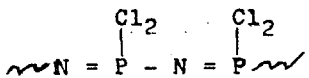
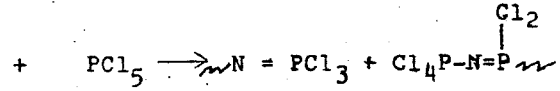

Thus, the number of chains present in the final reaction mixture will depend on the number of $PCl_5$ molecules present. The fewer $PCl_5$ molecules present, the longer will be the chains.

It is preferred to use from 0.25 moles to $1 \times 10^{-5}$ moles of $PCl_5$ per mole of chlorocyclophosphazene trimer or tetramer, and to conduct the polymerization at temperatures ranging from 200°C to 300°C for times as described in U.S. Pat. No. 3,370,020.

Having now described a preferred embodiment of the invention, it is not intended that it be limited except as may be required by the appended claims.

We claim:

1. In the polymerization of chlorocyclophosphazenes to produce a linear polymer $(NPCl_2)_n$ product in which $n$ is from about 16 to about 20,000, wherein the polymerization of cyclo trimer, tetramer or mixtures thereof is conducted at temperatures of between 200° and 300°C, the improvement which comprises: maintaining an amount of $PCl_5$ between 0.25 moles and $1 \times 10^{-5}$ moles of $PCl_5$ per mole of chlorophosphazene, present with said chlorophosphazene and conducting the polymerization in the presence of said amount of $PCl_5$.

2. The process of claim 1 wherein the chlorocyclophosphazene is substantially all trimer and the temperature is about 250°C.

3. The process of claim 1 wherein the chlorocyclophosphazene is a mixture of trimer and tetramer.

* * * * *